M. ROSENWASSER.
ART OF MANUFACTURING LEGGINGS.
APPLICATION FILED FEB. 7, 1912.
1,055,559.
Patented Mar. 11, 1913.
2 SHEETS—SHEET 1.
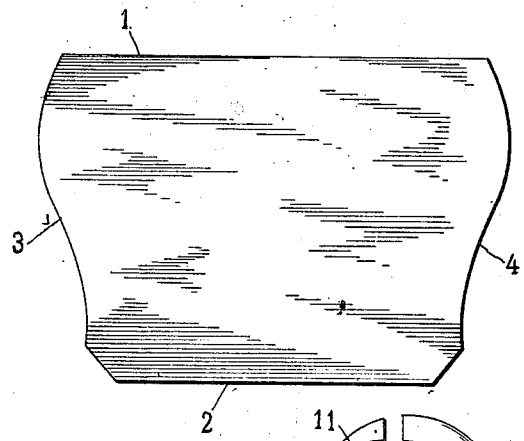
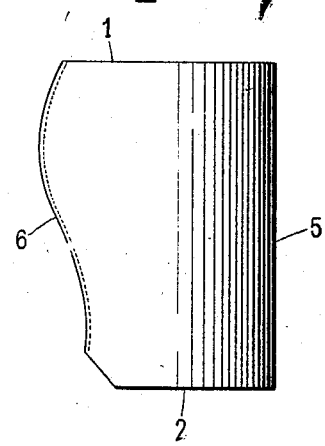
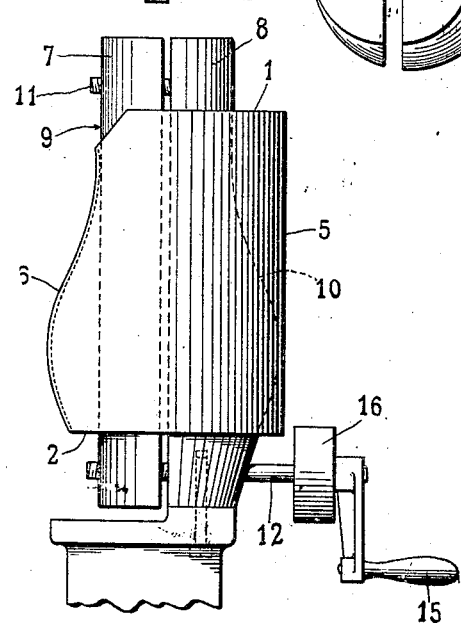
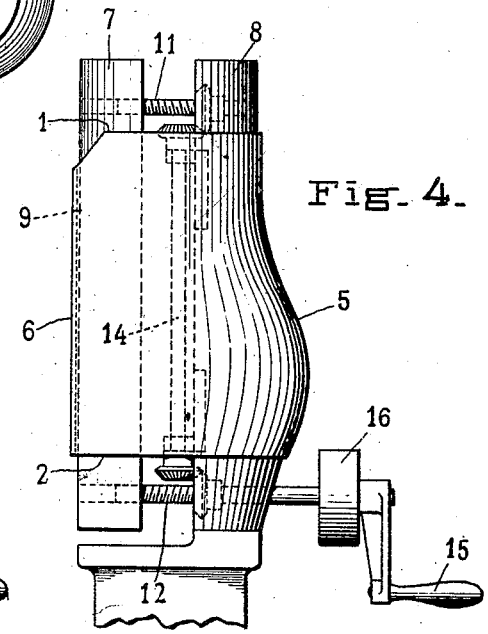
WITNESSES
INVENTOR
Morris Rosenwasser
BY
ATTORNEYS

M. ROSENWASSER.
ART OF MANUFACTURING LEGGINGS.
APPLICATION FILED FEB. 7, 1912.

1,055,559.

Patented Mar. 11, 1913.
2 SHEETS—SHEET 2.

WITNESSES
INVENTOR
M. Rosenwasser
BY
Wilson & Kent
ATTORNEYS

UNITED STATES PATENT OFFICE.

MORRIS ROSENWASSER, OF NEW YORK, N. Y.

ART OF MANUFACTURING LEGGINGS.

1,055,559. Specification of Letters Patent. Patented Mar. 11, 1913.

Application filed February 7, 1912. Serial No. 676,087.

*To all whom it may concern:*

Be it known that I, MORRIS ROSENWASSER, residing in the city, county, and State of New York, have invented certain new and useful Improvements in the Art of Manufacturing Leggings, of which the following is a specification.

This invention relates to a certain new and useful art of manufacturing garments of leather, cloth or like material, as for instance leggings, and one of its objects is to enable the manufacturer to standardize his product as to size, shape and quality.

Another object of the invention is to effect economy in the manufacture of articles of the kind referred to, and to make it possible to manufacture the same more readily and with certainty as to the finished products.

Other objects and aims of the invention, more or less broad than those stated above, will be in part obvious and in part specifically referred to in the course of the following description of the various steps included in the process which constitutes the invention; and the scope of protection contemplated will appear from the claims.

Figure 6:
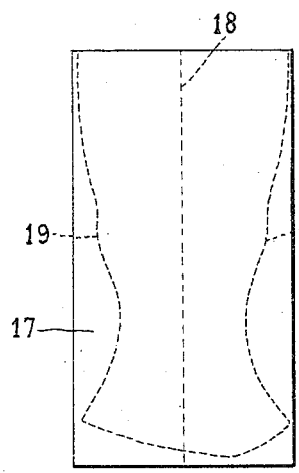
Figure 7:
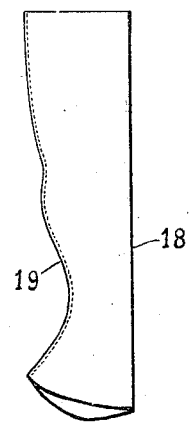
Figure 8:
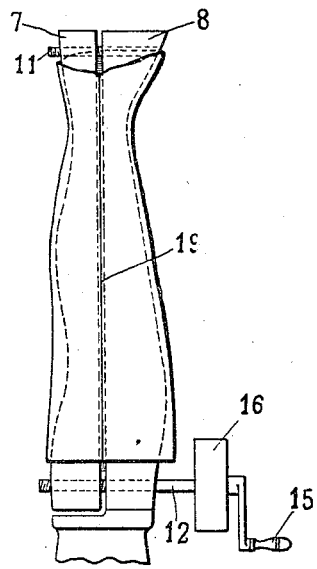
Figure 10:
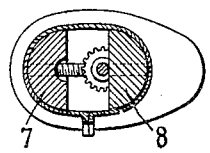
Figure 9:
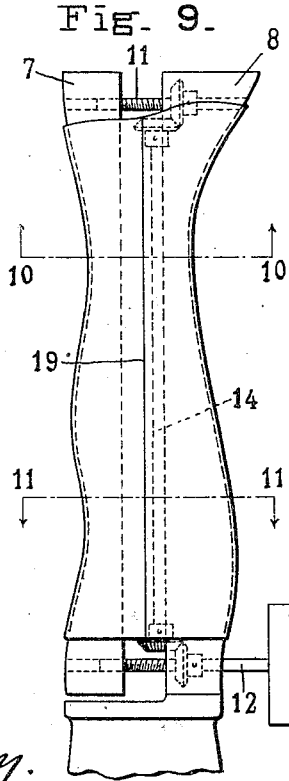
Figure 11:
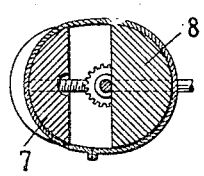

In the accompanying drawings which are to be taken as a part of this specification, and to which reference is to be had for a better understanding of the invention; Figure 1 is a plan view of a blank such as may be operated upon in the course of the manufacture according to one embodiment of my process; Fig. 2 is a plan view of the blank shown in Fig. 1 as it appears in a later stage of the process; Fig. 3 is an elevation showing such a blank as shown in Fig. 2, in place upon a certain forming apparatus which may be used in connection with the practice of my process; Fig. 4 is a view similar to Fig. 3, but showing the blank properly shaped by the manipulation of the forming apparatus; Fig. 5 is a top plan view of the expanding former; Fig. 6 is a plan view of a blank such as may be operated upon in a slightly different embodiment of my process from that shown in the preceding figures; Fig. 7 is a plan view of the blank shown in Fig. 6 as it appears in a later stage of the process; Fig. 8 is a view in elevation showing such a blank as shown in Fig. 7 in place upon the forming apparatus; Fig. 9 is a view similar to Fig. 8, but showing the blank properly shaped by the manipulation of the forming apparatus; Fig. 10 is a sectional view taken substantially on the line 10—10 of Fig. 9 showing the manner in which a portion of the blank is shaped by the forming apparatus; Fig. 11 is a sectional view taken on the line 11—11 of Fig. 9; and Fig. 12 is a view in perspective showing a completed legging which has been constructed in accordance with the embodiment of my process shown in the last six preceding figures of the drawings.

I will proceed to describe one embodiment of my invention as it is applied to the manufacture of leggings or the like, which articles, particularly when made of leather, should preferably be of a single piece of material adapted to encircle the leg, with its longitudinal edges meeting at the front to permit of easy adjustment and fastening, and with a bulged portion at the back which conforms to the shape of the leg. For obvious reasons the edge portions of the article should be substantially straight; and it is one of the characteristics of my new art that I am enabled to cut the blank at its edges in such a manner as will predetermine the bulge at the back of the finished article, while the finished article will nevertheless have straight edges, and there will have been no cutting away of material after the first cutting of the blank. Accordingly, the first step in the practice of the first embodiment of my invention is the provision of a suitable blank of leather or the like material, which may be cut as shown in Fig. 1 with top and bottom edges 1 and 2, preferably parallel, and with similar outwardly curved or otherwise non-rectilinear side edges 3 and 4. This blank is next soaked in water or other liquid to make it more pliable. Thereafter the blank is folded upon a median line, with the edges 3 and 4 superposed one over the other, and these edges are secured together as by a line of stitching. Obviously, instead of cutting the edges in the manner described, I may make them straight in the first instance and give to the line of stitching the desired curvature. In either case the line of stitching defines the edges of the finished legging. The blank formed as described, and as shown for example in Fig. 2, constitutes, when it is opened up, a tube, having a longitudinally straight side 5 and a side 6 opposite to the side 5, longitudinally curved or otherwise non-rectilinear in accordance with the line of the stitching. In the illustrative operation which I am describing, and which leads to the production of a legging having a bulge at the back as shown in Fig. 4, the side 6 will be curved substantially as shown in Fig. 2, so that the tube will have a greater cross-sectional area at one end than at the other. This tube is now manipulated, preferably by means of the application of pressure interiorly of the tube against the material thereof, until the curved side 6 has become straight, and the straight side 5 has become curved to correspond with the original curve of the side 5. As an example of one way of doing this, I may place the tubular blank shown in Fig. 2 upon an expanding former shown in Figs. 3 and 4, which expanding former may comprise relatively movable sections 7 and 8, the section 7 having an outwardly longitudinally straight side 9, and the section 8 having an outwardly longitudinally convexed surface 10, said surfaces 9 and 10 being on opposite sides of the expanding former as shown. Preferably the blank heretofore described has been cut so that the smallest cross sectional area thereof is substantially equal to the greatest width of the expanding former when the latter is contracted. The tube, shaped as previously described and with its side 6 longitudinally bulged in substantially the same degree as is the surface 10 of the expanding former, is placed upon the latter in the manner shown in Fig. 3, wtih the convexed or bulged part 6 of the tube overlying the longitudinally straight part 9 of the expanding former, and the straight part 5 of the tube overlying the convexed part 10 of the expanding former. The two sections of the expanding former are now caused to separate; in the apparatus described the section 7 moves relatively to section 8 through the intermediary of shafts 11 and 12 secured in the ends of the section 8 and threaded into the ends of section 7, said shafts having parallel movement by means of the connecting shaft 14 interposed between said shafts 11 and 12 and having miter gears at its ends engaging with corresponding gears on the shafts 11 and 12. In the illustrative showing, shaft 12 is the driving shaft and is operated by means of a crank handle 15 or a pulley 16. In any event, the sections 7 and 8 are caused to separate, and in separating the tube upon the expanding former is gradually distorted from its original form until it assumes the form shown in Fig. 4, the erstwhile convexed portion 6 of the tube becoming a longitudinally straight portion, as shown in Fig. 4, and the part 5 of the tube assuming a longitudinally bulged or convexed form, as shown in Fig. 4, in correspondence with the original bulge or convexity of side 6; the tube in other words conforms to the superficial configuration of the expanding former, but without subjecting one part of the tube to any greater degree of stretching than that to which another part is subjected. Since the blank was originally provided with a curved side 6 made in correspondence with the bulged surface 10 of the expanding former, it follows that when what was the convexed or bulged surface 6 becomes longitudinally straight, as shown in Fig. 2, the forming operation may be taken to be completed, and further expansion of the expanding former stopped. The tube is now split along its longitudinally straight side, which will be the front of the legging, and subsequently finished up into a complete legging, such as is familiar.

Figure 12:
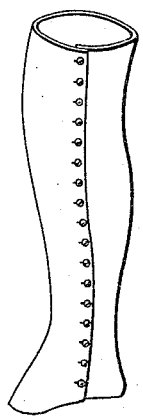

The embodiment of my process shown in Figs. 6 to 12 inclusive, relates more especially to the manufacture of leggings out of cloth. In this embodiment of my invention blank 17 is provided, which blank may be cut oblong, as shown, and then folded along the median line 18, and the material then stitched along the lines 19, as shown, or the blank may be initially cut to the form defined, between the top and bottom edges of the blank and the lines 19. In any event, the blank when folded along the median line is stitched after the manner shown in Fig. 7 of the drawings. In this embodiment of my process, as in the embodiment first described, a line of stitching is formed upon the folded blank which will predetermine the contour of the back and sides of the finished article. In leggings made of cloth, it is desirable that the over-lapping edges will come at the side of the leg as indicated in Fig. 12. Therefore, the blank as indicated in Fig. 7 is stitched in such manner that when the blank has been formed into the legging, the meeting edges will be straight, as indicated in Fig. 12. The blank, when it has taken the form illustrated in Fig. 7, is then preferably soaked in water or other liquid to make it more pliable, and when this has been done, the blank, which is now in tubular form, is positioned upon the forming apparatus, said forming apparatus comprising relatively movable sections 7 and 8. In this embodiment of the process, the forming member 8 is shaped to correspond to the front portion of the finished legging, and the forming member 7 is shaped to correspond to the rear portion of the finished legging, the blank being positioned upon the forming apparatus so that the stitched portion comes at one side of said forming member. The forming members are then caused to separate by mechanism which has been already described, such separation gradually distorting the tubular blank portion until it assumes the form shown in Fig. 9 of the drawings, and it will be noted that the form corresponds to the superficial configuration of the forming members without subjecting one part of the material of the tubular blank to any greater degree of stretching than that to which another part is subjected, inasmuch as during the stitching of the blank, provision has been made to furnish the necessary material to form the distorted portions. When the blank has been stretched to the desired form, the line of stitching will then be substantially straight, as indicated in Fig. 9 of the drawings, whereupon when the legging is completed, the fastening edges will also be substantially straight as indicated in Fig. 12.

It will accordingly be seen that I have provided a process well adapted to attain, among others, all the objects and aims of my invention which have been heretofore set forth. By means of the described process, it is possible to effect a great saving in labor and material, thus lessening the cost of production.

Having thus described my invention, what I claim as new and desire to secure by Letters Patent, is:—

1. The art of manufacturing leggings or other articles which consists in providing a blank of suitable material having matching curved edges, and then manipulating the blank to straighten said edges and to impart to that portion of the blank intermediate said edges a curve corresponding substantially to the original curve of said edges.

2. The art of manufacturing leggings or other articles, which consists in providing a blank of suitable material having matching curved edges, securing said edges together, and then manipulating the blank to straighten said edges and to impart to that portion of the blank intermediate said edges a curve corresponding substantially to the original curve of said edges.

3. The art of manufacturing leggings or other articles, which consists in providing a blank of suitable material in tubular form having a longitudinally straight portion on one side and a longitudinally curved portion on the other, and then operating upon the blank to straighten the originally curved portion and to curve the originally straight portion to correspond substantially to the original curve.

4. The art of manufacturing leggings or other articles, which consists in providing a blank of suitable material in tubular form having a longitudinally straight portion on one side and a longitudinally curved portion on the other, and then operating upon the blank from within the tube to straighten the originally curved portion and to curve the originally straight portion to correspond substantially to the original curve.

5. The art of manufacturing leggings or other articles, which consists in providing a blank of suitable material having the form of a tube whose cross-sectional area is greater at one end than at the other, the tube at one side of its longitudinal axis being parallel to the axis and at the opposite side out of parallelism therewith, and then operating upon the tube to bring into parallelism with the axis that part of the tube which was originally out of parallelism, and correspondingly to throw out of such parallelism the erstwhile parallel part.

6. The art of manufacturing leggings or other articles, which consists in providing a blank of suitable material having the form of a tube whose cross-sectional area is greater at one end than at the other, the tube at one side of its longitudinal axis being parallel to the axis and at the opposite side out of parallelism therewith, then operating upon the tube to bring into parallelism with the axis that part of the tube which was originally out of parallelism, and correspondingly to throw out of such parallelism the erstwhile parallel part, and then slitting the tube longitudinally on its side that is parallel to the longitudinal axis.

7. The art of manufacturing leggings or other articles, which consists in providing a blank of suitable material having the form of a tube whose cross-sectional area is greater at one end than at the other, the tube at one side of its longitudinal axis being parallel to the axis and at the opposite side out of parallelism therewith, and then operating upon the tube from within to bring into parallelism with the axis that part of the tube which was originally out of parallelism, and correspondingly to throw out of such parallelism the erstwhile parallel part.

8. The art of manufacturing leggings or other articles which consists in providing a blank of suitable material having non-rectilinear edges, and then manipulating the blank to straighten said edges and to impart to that portion of the blank intermediate said edges a changed form corresponding substantially to the aforesaid original line-characteristic of said edges.

9. The art of manufacturing leggings or other articles which consists in providing a blank of suitable material having non-rectilinear edges, and then manipulating the blank to straighten said edges and simultaneously to impart to that portion of the blank intermediate said edges a changed form corresponding substantially to the aforesaid original line-characteristic of said edges.

10. The art of manufacturing leggings or other articles, which consists in providing a blank of suitable material in tubular form having a longitudinally straight portion on one side and a longitudinally curved portion on the other, then exerting pressure from within the tube against the longitudinally curved portion thereof to straighten the same and simultaneously exerting pressure from within the tube against the previously longitudinally straight portion of the same to impart to said portion a longitudinal curve corresponding substantially to that of the original curved portion.

11. The art of manufacturing leggings or the like, which consists in providing a blank of suitable material, similarly curved at two of its opposite edges, uniting said two edges to form a tube which has a longitudinally straight side and a longitudinally curved side opposite thereto, placing the tube upon an expanding former having a shape generally like that of the tube but with the straight portion of the tube over the curved portion of the expanding former, and the curved portion of the tube over the straight portion of the expanding former, then expanding the former to stretch the tube, and then separating the joined edges of the tube.

12. The art of manufacturing leggings or other articles, which consists in providing a blank of suitable material in tubular form having a longitudinally bulged portion, and then applying pressure to said tubular blank interiorly thereof to eliminate the bulge from said bulged portion and to form a similar bulged portion in another part of said tube.

13. The art of manufacturing a legging or similar article, which consists in providing a blank of suitable material, folding said blank longitudinally so that its edges lie in superposed relation, forming a line of stitching adjacent said superposed edges, said stitching being so formed that when the blank is opened in a tubular form the portion thereof including the stitching will have a longitudinally bulged portion, and then applying pressure to said tubular blank interiorly thereof to eliminate the bulge from said bulged portion and to form a similar longitudinal bulged portion in another part of said tube.

14. The art of manufacturing leggings or other similar articles, which consists in providing a blank of suitable material having curved edges secured together; then manipulating the blank to form a tube in which said edges are made substantially straight, and in which that portion of the blank intermediate said edges is given a shape designed to utilize, in its formation, the surplus material incident to the elimination of the curved edges.

15. The art of manufacturing leggings or other similar articles, which consists in forming a tube of suitable material with a fullness therein; and then operating upon the tube so as, in effect, to transfer said fullness to a different locality in said tube.

In testimony whereof I affix my signature in the presence of two witnesses.

MORRIS ROSENWASSER.

Witnesses:
NATHALIE THOMPSON,
MORRIS BLAU.